(12) United States Patent
Takori et al.

(10) Patent No.: US 11,904,757 B2
(45) Date of Patent: Feb. 20, 2024

(54) VEHICLE HEADLIGHT DEVICE

(71) Applicant: HONDA MOTOR CO., LTD., Tokyo (JP)

(72) Inventors: Masayoshi Takori, Saitama (JP); Yuji Tsuchiya, Saitama (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 18/165,336

(22) Filed: Feb. 7, 2023

(65) Prior Publication Data
US 2023/0249608 A1 Aug. 10, 2023

(30) Foreign Application Priority Data
Feb. 8, 2022 (JP) ................................. 2022-018319

(51) Int. Cl.
*B60Q 1/08* (2006.01)
*F21S 41/60* (2018.01)

(52) U.S. Cl.
CPC ............... *B60Q 1/08* (2013.01); *F21S 41/60* (2018.01)

(58) Field of Classification Search
CPC .................................. F21S 41/60; B60Q 1/08
See application file for complete search history.

(56) References Cited

U.S. PATENT DOCUMENTS

| | | | | |
|---|---|---|---|---|
| 9,024,740 B2* | 5/2015 | Min | ......................... | B60Q 1/18 340/901 |
| 9,771,021 B1 | 9/2017 | Lindsay | | |
| 9,789,808 B1* | 10/2017 | Hong | ..................... | B60Q 1/143 |
| 10,126,411 B2 | 11/2018 | Gilliland et al. | | |
| 10,217,361 B2* | 2/2019 | Jung | ..................... | B60Q 5/006 |
| 10,421,389 B2* | 9/2019 | Nagata | ................. | G06V 10/143 |
| 10,457,193 B2* | 10/2019 | Ichikawa | .............. | F21S 41/148 |
| 10,558,416 B2* | 2/2020 | Suzuki | ................... | B60Q 1/547 |
| 10,796,580 B2* | 10/2020 | Dellock | ............ | G08G 1/09623 |
| 10,843,622 B2* | 11/2020 | Lee | ........................ | B60Q 1/085 |

(Continued)

FOREIGN PATENT DOCUMENTS

| | | |
|---|---|---|
| JP | 2007246060 A | 9/2007 |
| JP | 2009220631 A | 10/2009 |

(Continued)

OTHER PUBLICATIONS

Office Action issued in the U.S. Appl. No. 18/165,335, dated Jun. 8, 2023.

(Continued)

*Primary Examiner* — Arman B Fallahkhair
(74) *Attorney, Agent, or Firm* — CKC & Partners Co. LLC

(57) ABSTRACT

Provided is a vehicle headlight device which can improve overlooking of pedestrians by a drive, even under adverse conditions such as nighttime or rain at night. A vehicle headlight device includes: a pattern photoirradiator (right-side pattern irradiation lamp) which irradiates light on a predetermined irradiation pattern light distribution region of a vehicle in an irradiation pattern in which a bright region and a dark region are alternately repeated; and a cornering light which irradiates a light distribution region under the irradiation pattern light distribution region in a form in which an entire area is a bright region. In this embodiment, the pattern photoirradiator irradiates light synchronously with the cornering light.

5 Claims, 12 Drawing Sheets

(56) References Cited

U.S. PATENT DOCUMENTS

| | | |
|---|---|---|
| 10,981,497 B2 * | 4/2021 | Lee ................ B60Q 1/547 |
| 11,305,688 B2 * | 4/2022 | Stein ............... B60Q 1/525 |
| 11,440,469 B2 * | 9/2022 | Ahn ................ B60Q 1/085 |
| 11,548,432 B2 * | 1/2023 | Lee ................ B60Q 1/085 |
| 2003/0138132 A1 | 7/2003 | Stam et al. |
| 2007/0019396 A1 | 1/2007 | Kaiba |
| 2009/0284751 A1 | 11/2009 | Drake, Jr. et al. |
| 2013/0058116 A1 * | 3/2013 | Galbas ............... B60Q 1/48 362/512 |
| 2013/0093583 A1 | 4/2013 | Shapiro |
| 2019/0171871 A1 | 6/2019 | Zhang et al. |

FOREIGN PATENT DOCUMENTS

| | | |
|---|---|---|
| JP | 2014010975 A | 1/2014 |
| JP | 2016199111 A | 12/2016 |

OTHER PUBLICATIONS

Notification of Reasons for Refusal issued in the JP Patent Application No. 2022-018315, dated Nov. 7, 2023.
Notification of Reasons for Refusal issued in the JP Patent Application No. 2022-018319, dated Dec. 5, 2023.

* cited by examiner

VEHICLE HEADLIGHT DEVICE

This application is based on and claims the benefit of priority from Japanese Patent Application No. 2022-018319, filed on 8 Feb. 2022, the content of which is incorporated herein by reference.

BACKGROUND OF THE INVENTION

Field of the Invention

The present invention relates to a vehicle headlight device.

Related Art

A device has been proposed which adjusts and controls the optical axis direction of a vehicle headlight device based on steering angle and vehicle speed (for example, refer to Patent Document 1). With the vehicle headlight device of Patent Document 1, it is configured so as to divide the conditions related to a change angle calculation of the optical axis direction, in response to the degree of steering angle and vehicle speed.

Patent Document 1: Japanese Unexamined Patent Application, Publication No. 2007-246060

SUMMARY OF THE INVENTION

It is well known that there are many accidents at intersections, and this type of accident is not seldom caused by overlooking of pedestrians. It should be made so that such overlooking of pedestrians does not occur. The technology of Patent Document 1 changes the optical axis direction of the vehicle headlight device to improve visibility in the vicinity of a pedestrian crossing; however, it is not considered that adequate measures have been necessarily taken from the viewpoint of preventing overlooking of pedestrians under adverse conditions, particularly at nighttime and rain at night.

The present invention has been made taking account of the above such situation, and has an object of providing a vehicle headlight device which can improve overlooking of pedestrians by a driver, even under adverse conditions such as nighttime and rain at night.

A vehicle headlight device according to a first aspect of the present invention (for example, the vehicle headlight device 1 described later) includes: a pattern photoirradiator (for example, the left-side pattern irradiation lamp 41, right-side pattern irradiation lamp 42 as pattern photoirradiators described later) which irradiates light on a predetermined irradiation pattern light distribution region (for example, the irradiation patter light distribution regions 16, 17 described later) of a vehicle (for example, the vehicle 2 described later) in an irradiation pattern (for example, the irradiation pattern Lp described later) in which a bright region (for example, the bright region a1 described later) and a dark region (for example, the dark region a2 described later) are alternately repeated; and a cornering light (for example, the left-side cornering light 43, right-side cornering light 44 described later) which irradiates a light distribution region (for example, the light distribution region 44a described later) under the irradiation pattern light distribution region in a form in which an entire area is a bright region.

According to a second aspect of the present invention, in the vehicle headlight device as described in the first aspect, the pattern photoirradiator irradiates light synchronously with the cornering light.

With the vehicle headlight device of the first aspect, since the irradiation pattern light distribution region of a direction in which the vehicle is trying to change course is irradiated in the irradiation pattern in which the bright region and dark region are alternately repeated by the pattern photoirradiator, the presence of the pedestrian at a side is easily recognized from the driver according to the visual property of a person. In addition thereto, the light distribution region below the irradiation pattern light distribution region is irradiated by the cornering light, whereby overlooking of pedestrians by the driver can be improved, even under adverse conditions such as nighttime or rain at night.

In the vehicle headlight device according to the second aspect, the pattern photoirradiator irradiates light synchronously with the cornering light; therefore, it is possible for the driver to reliably recognize the presence of the pedestrian in the direction in which the vehicle tries to change course.

BRIEF DESCRIPTION OF THE DRAWINGS

in FIG. 2 on a vehicle turning right at an intersection;

in FIG. 2 on a vehicle turning right at an intersection;

in FIG. 2 on a vehicle turning right at an intersection;

DETAILED DESCRIPTION OF THE INVENTION

Hereinafter, an embodiment of the present invention will be explained while referencing the drawings. It should be noted that, in the following explanation, irradiation pattern light distribution region is an irradiation area of a certain specified light, and irradiation pattern is an irradiation shape of light relative to the irradiation pattern light distribution region.

Figure 1:
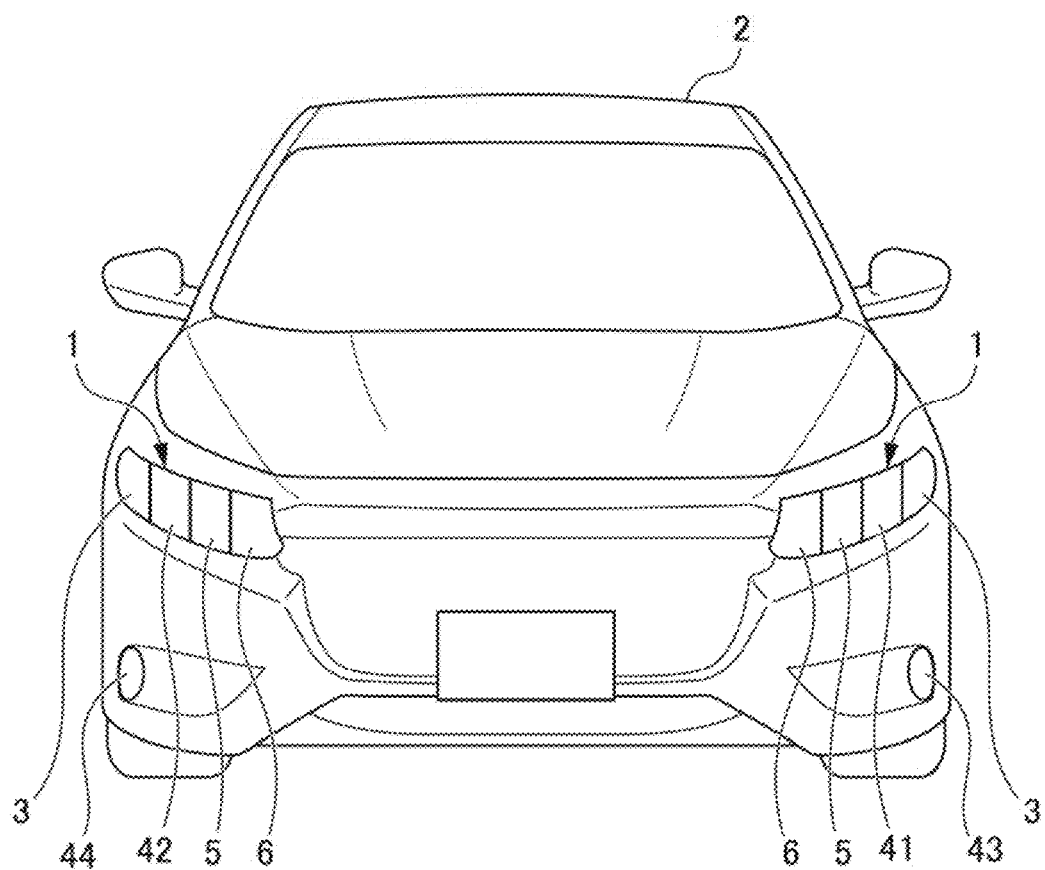
FIG. 1 is a schematic diagram showing a vehicle headlight device as an embodiment of the present invention.

FIG. 1 is a conceptual block diagram showing a vehicle headlight device of an embodiment of the present invention. The vehicle headlight devices 1 are included at each of a left side and right side in a left/right symmetrical form viewing from the central position in the vehicle width direction of a vehicle 2. In the vehicle headlight device 1, a turn signal lamp 3, pattern irradiation lamp 4, low beam lamp 5 and high beam lamp 6 are arranged in order from an outer side toward an inner side in the vehicle width direction.

It should be noted that the pattern irradiation lamp 4 is a generic term for the left-side pattern irradiation lamp 41 which is a left-side photoirradiator, and a right-side pattern irradiation lamp 42 which is a right-side photoirradiator. In addition, a left-side cornering light 43 is provided outwardly below the vehicle headlight device 1 on the left side, and a right-side cornering light 44 is provided outwardly below the vehicle headlight device 1 on the right side.

The turn signal lamp 3 is a normal lamp of this type. The pattern irradiation lamp 4 as a pattern photoirradiator irradiates light onto irradiation pattern light distribution regions 16, 17 described later of the vehicle 2 in irradiation patterns in which a bright region and dark region are alternately repeated. The low beam lamp 5 irradiates light in a predetermined light distribution area of a low beam. The high beam lamp 6 irradiates light in a predetermined light distribution area of a high beam. In the above, the irradiation pattern light distribution region 16 is a left-side light distribution region on the left side of the travel roadway of one's own vehicle 2. The irradiation pattern light distribution region 17 is a right-side light distribution region on the right side of the travel roadway of one's own vehicle 2.

The left-side cornering light 43 illuminates when a condition determined as the driver having an intention of turning left is satisfied such as illumination of the low beam lamp 5, a left turn operation on the directional indicator lever (not shown) and, vehicle speed at the moment of this operation. The left-side cornering light 43 irradiates a light distribution region (not shown) based on the light distribution region 44a described later under the irradiation pattern light distribution region 16, in a form where the entire area is the bright region. In other words, the left-side cornering light 43 irradiates the road surface of a region including the left side of the vehicle 2.

The right-side cornering light 44 illuminates when a condition determined as the driver having an intention of turning right is satisfied, such as illumination of the low beam lamp 5, a right turn operation on the directional indicator lever (not shown), and vehicle speed at the moment of this operation. The right-side cornering light 44 irradiates a light distribution region 44a described later under the irradiation pattern light distribution region 17, in a form where the entire area is the bright region. In other words, the right-side cornering light 44 irradiates the road surface of a region including the right side of the vehicle 2. It should be noted that the vehicle 2 equipped with the vehicle headlight device 1 is called one's own vehicle 2 as appropriate below.

Figure 2:
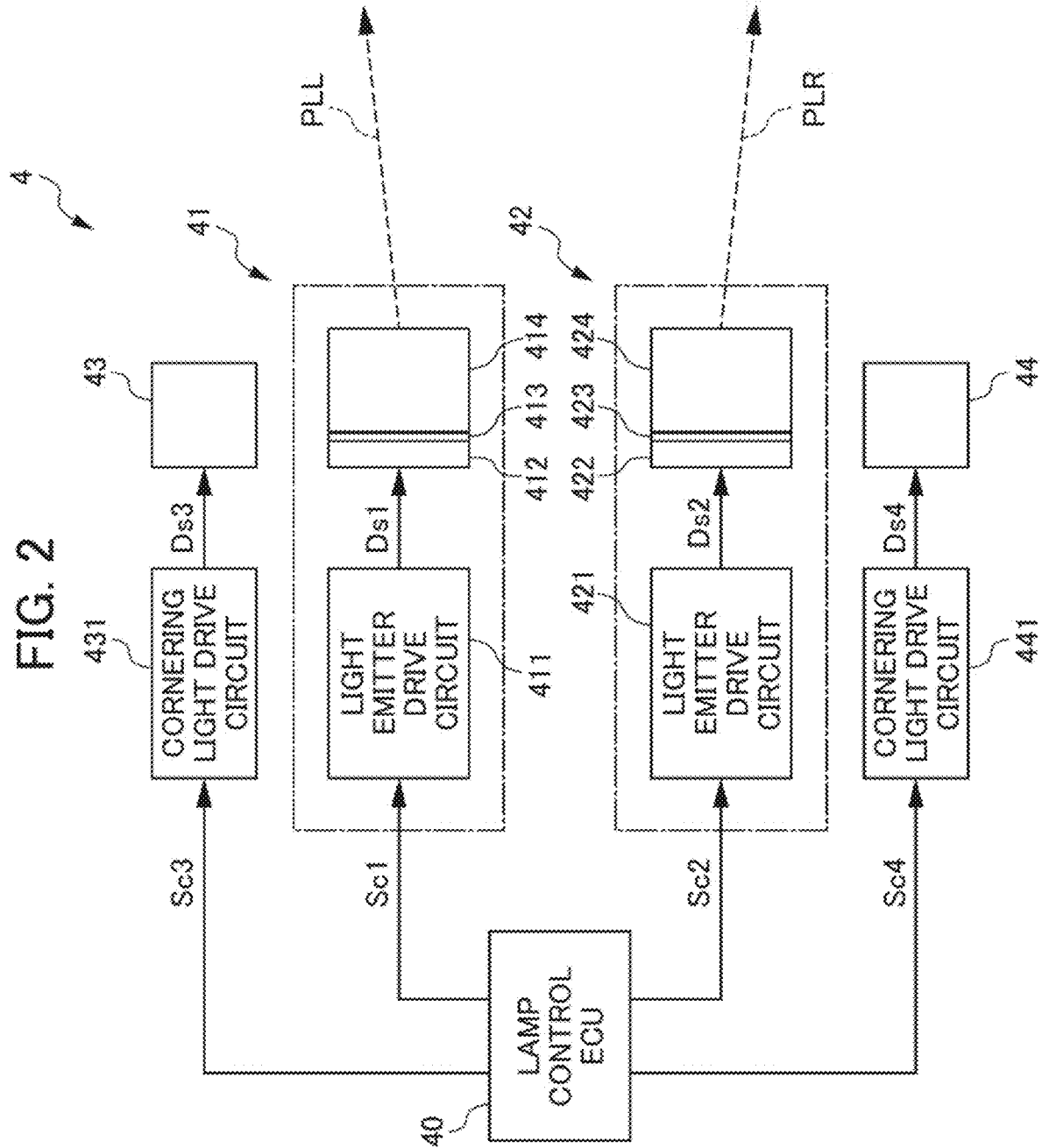
FIG. 2 is a conceptual block diagram showing a pattern irradiation lamp and left/right cornering lights in the vehicle headlight device of FIG. 1.

FIG. 2 is a conceptual block diagram showing the pattern irradiation lamp 4 and left/right cornering lights in the vehicle headlight device 1 of FIG. 1. The pattern irradiation lamp 4 has a left-side pattern irradiation lamp 41 which is a left-side photoirradiator, and a right-side pattern irradiation lamp 42 which is a right-side photoirradiator. The left-side pattern irradiation lamp 41 is configured to include a light emitter drive circuit 411, surface emitting element 412, shading mask 413 and projection optical system 414.

The right-side pattern irradiation lamp 42 is configured to include a light emitter drive circuit 421, surface emitting element 422, shading mask 423 and projection optical system 424. The shading mask 413 has a light transmission slit corresponding to the first irradiation pattern in which a bright region and dark region are alternately repeated. The shading mask 423 has a light transmission slit corresponding to the second irradiation pattern in which a bright region and dark region are alternately repeated. In one embodiment of the present invention, the first irradiation pattern and second irradiation pattern are the same irradiation pattern.

The light emitter drive circuit 411 of the left-side pattern irradiation lamp 41 generates the element drive signal Ds1 and supplies to the surface emitting element 412 in response to the startup command signal Sc1 supplied from the lamp control ECU 40 equipped to the vehicle 2. The surface emitting element 412 emits light in response to the element drive signal Ds1. By the emission of the surface emitting element 412, the left-side pattern irradiation lamp 41 irradiates the left-side irradiation light PLL of the first irradiation pattern towards the light distribution region described later, through the shading mask 413 and projection optical system 414.

The light emitter drive circuit 421 of the right-side pattern irradiation lamp 42 generates the element drive signal Ds2 and supplies to the surface emitting element 422 in response to the startup command signal Sc2 supplied from the lamp control ECU 40. The surface emitting element 422 emits light in response to the element drive signal Ds2. By the emission of the surface emitting element 422, the right-side pattern irradiation lamp 42 irradiates the right-side irradiation light PLR of the second irradiation pattern towards the light distribution region 17 described later, through the shading mask 423 and projection optical system 424. It should be noted that the first irradiation pattern and second irradiation pattern are the same irradiation pattern in one embodiment of the present invention, as mentioned above.

Corresponding to the left-side cornering light 43, a cornering light drive circuit 431 driving this is provided. The cornering light drive circuit 431 generates an element drive signal Ds3 and supplies to the left-side cornering light 43 in response to the left-side corning light lighting command signal Sc3 supplied from the lamp control ECU 40. The left-side cornering light 43 irradiates the road surface on the left side of the vehicle 2 in response to the element drive signal Ds3

Corresponding to the right-side cornering light 44, a cornering light drive circuit 441 driving this is provided. The cornering light drive signal 441 generates the element drive signal Ds4 and supplies to the right-side cornering light 44, in response to the right-side cornering light lighting command signal Sc4 supplied from the lamp control ECU 40. The right-side cornering light 44 irradiates the road surface on the right side of the vehicle 2 in response to the element drive signal Ds4.

Figure 3:
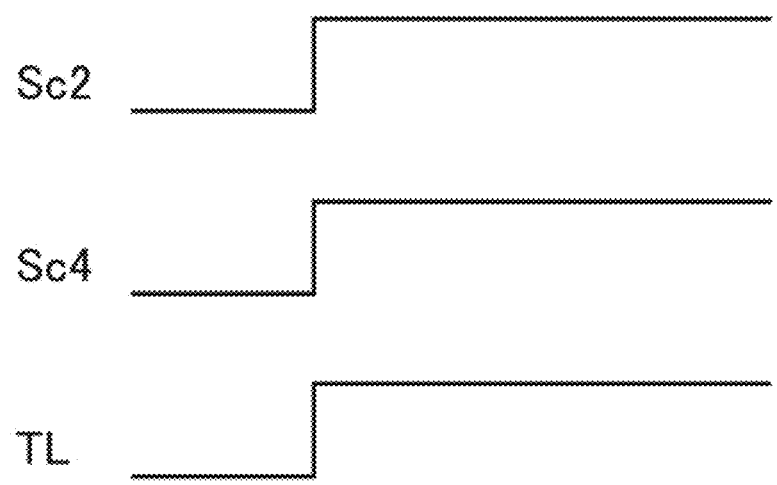
FIG. 3 is a timing chart showing operation of the pattern irradiation lamp and cornering light of FIG. 2.

FIG. 3 is a timing chart showing operation of the pattern irradiation lamp and left/right cornering lights in FIG. 2. In FIG. 3, the reference symbol TL is the lighting command signal. The lighting command signal TL is generated and supplied to the lamp control ECU 40 when a condition determined as the driver having an intention of right turning from a higher-order ECU of the lamp control ECU 40 in FIG. 2 is satisfied. The lighting command signal TL indicates a lighting instruction when the signal level is high, and a lights-out instruction when low.

The lamp control ECU 40 turns the right-side cornering light lighting command signal Sc4 to lighting instruction level, in response to the lighting command signal TL turning to a lighting instruction. Furthermore, the lamp control ECU 40 turns the startup command signal Sc2 to the lighting instruction level, simultaneously with turning the right-side cornering light lighting command signal Sc4 to the lighting instruction level. As a result, when a condition determined as the driver having a right turn intention is satisfied, the right-side cornering light 44 and right-side pattern irradiation lamp 42 simultaneously irradiate the irradiation light.

Similarly to when explained by referencing FIG. 3, when a condition determined as the driver having an intention of left turn is satisfied, the left-side cornering light 43 and left-side pattern irradiation lamp 41 synchronously irradiate the irradiation light.

Figure 4:
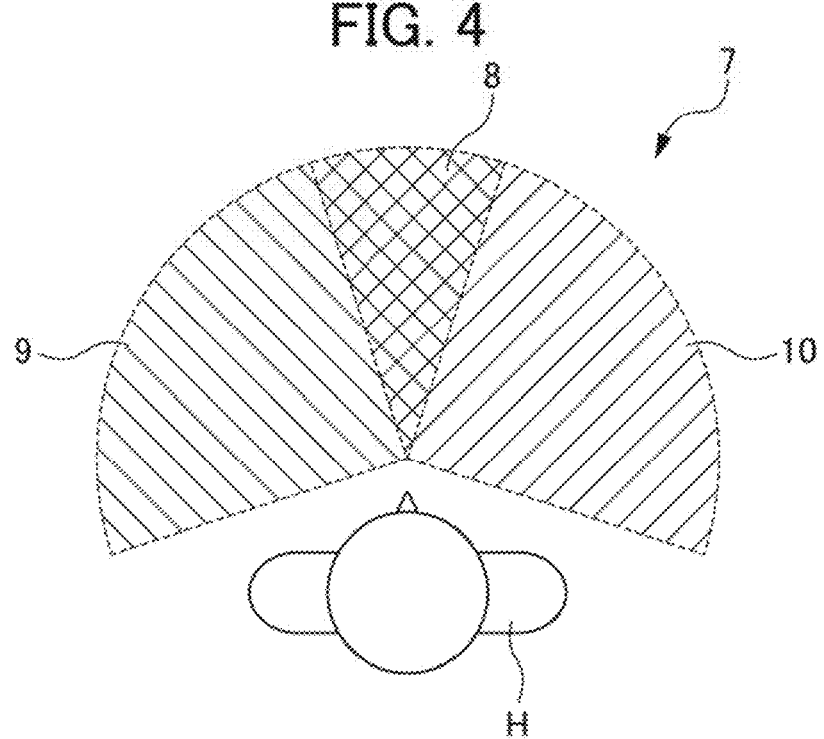
FIG. 4 is a view schematically showing a visual property of a person according to the technical concept of the present invention.

FIG. 4 is a view schematically showing a visual property of a person according to the technical concept of the vehicle headlight device 1 of the present invention described later. In FIG. 3, a forward field of view 7 of a person H is divided into a center field of view 8 which widens at a fixed acute angle to the left and right from a front face, and a left peripheral field of view 9 and right peripheral field of view 10 adjacent on the left and right of the center field of view 8, from the visual property of the person.

The general visual property of a person exhibits a tendency whereby shapes are clearly visible but reaction to movement is delayed, in the center field of view 8. The left peripheral field of view 9 and right peripheral field of view 10 exhibit a tendency whereby shapes are vague, but reaction to movement is fast, i.e. sensitivity to motion is high. The vehicle headlight device 1 of the present invention is based on the idea of actively using the aforementioned such visual property of a person.

Figure 5:
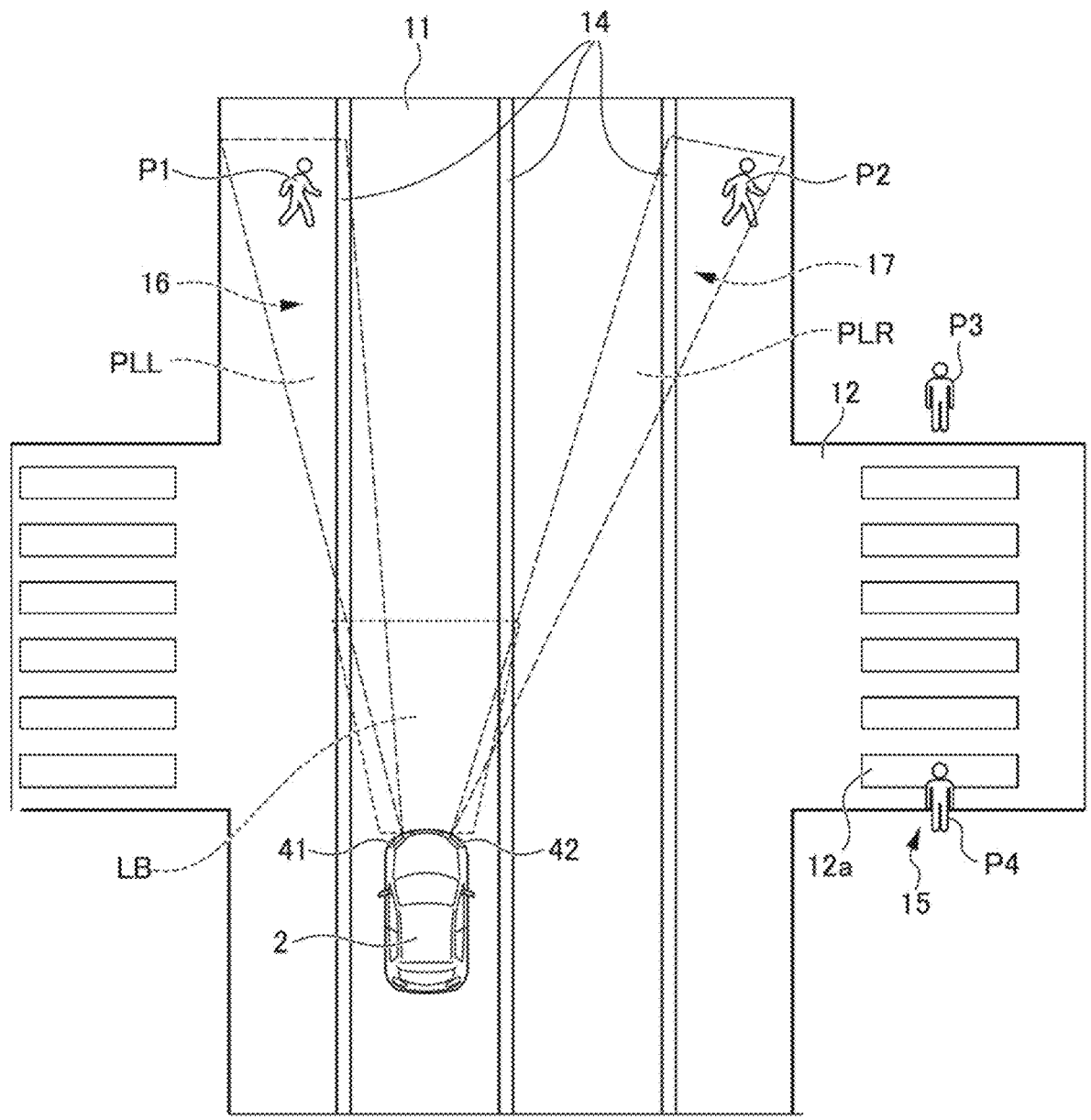
FIG. 5 is a schematic diagram showing, in a plan view, irradiation light from the pattern irradiation lamp of FIG. 2 on a vehicle traveling on a straight road.

FIG. 5 is a schematic diagram showing, in a plan view, the irradiation light from the pattern irradiation lamps 41, 42 in FIG. 2 of the vehicle 2 going straight on a straight road. FIG. 5 shows a case of the vehicle 2 trying to go straight on the road 11 on which positioned. The road 11 is a road having wide width on which the divider lines 14 including a road center line are drawn, whereby sidewalks are demarcated. It should be noted that the irradiation light from the low beam lamp 5 is indicated by the reference symbol LB.

During nighttime, the low beam lamp 5, left-side pattern irradiation lamp 41 and right-side pattern irradiation lamp 42 irradiate the irradiation light PLL and PLR according to manual operation by the driver or an auto-light function. The left-side pattern irradiation lamp 41 irradiates the irradiation pattern light distribution region 16 of the left-side irradiation light PLL. The right-side pattern irradiation lamp 42 irradiates the irradiation pattern light distribution region 17 of the right-side irradiation light PLR.

It should be noted that the left-side cornering light 43 irradiates the road surface of the light distribution region 43a including the left side of the vehicle 2, and the right-side cornering light 44 irradiates the road surface of the light distribution region 44a including the right side of the vehicle 2. In the case of the vehicle 2 going straight on a straight road as in FIG. 5, the left-side corning light 43 and right-side cornering light 44 are unlit. The light distribution region 43a of the left-side corning light 43 is symmetrical with the light distribution region 44a of the right-side cornering light 44, relative to the center line in the front/rear direction of the vehicle 2 in a plan view from FIG. 6A to FIG. 6C.

Figure 6A:
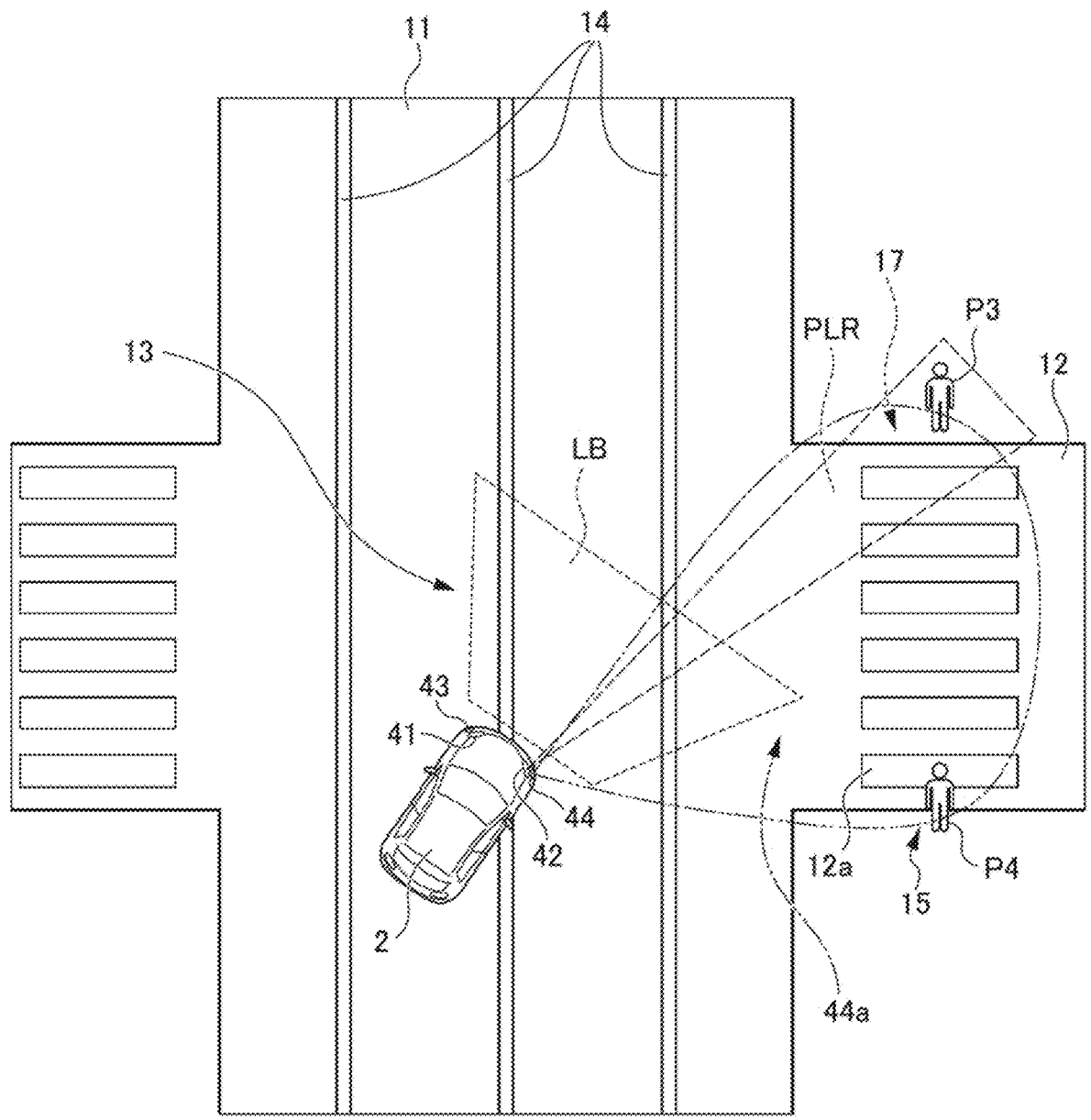
FIG. 6A is a schematic diagram showing, in a plan view, irradiation light from the pattern irradiation lamp, etc.
Figure 6B:
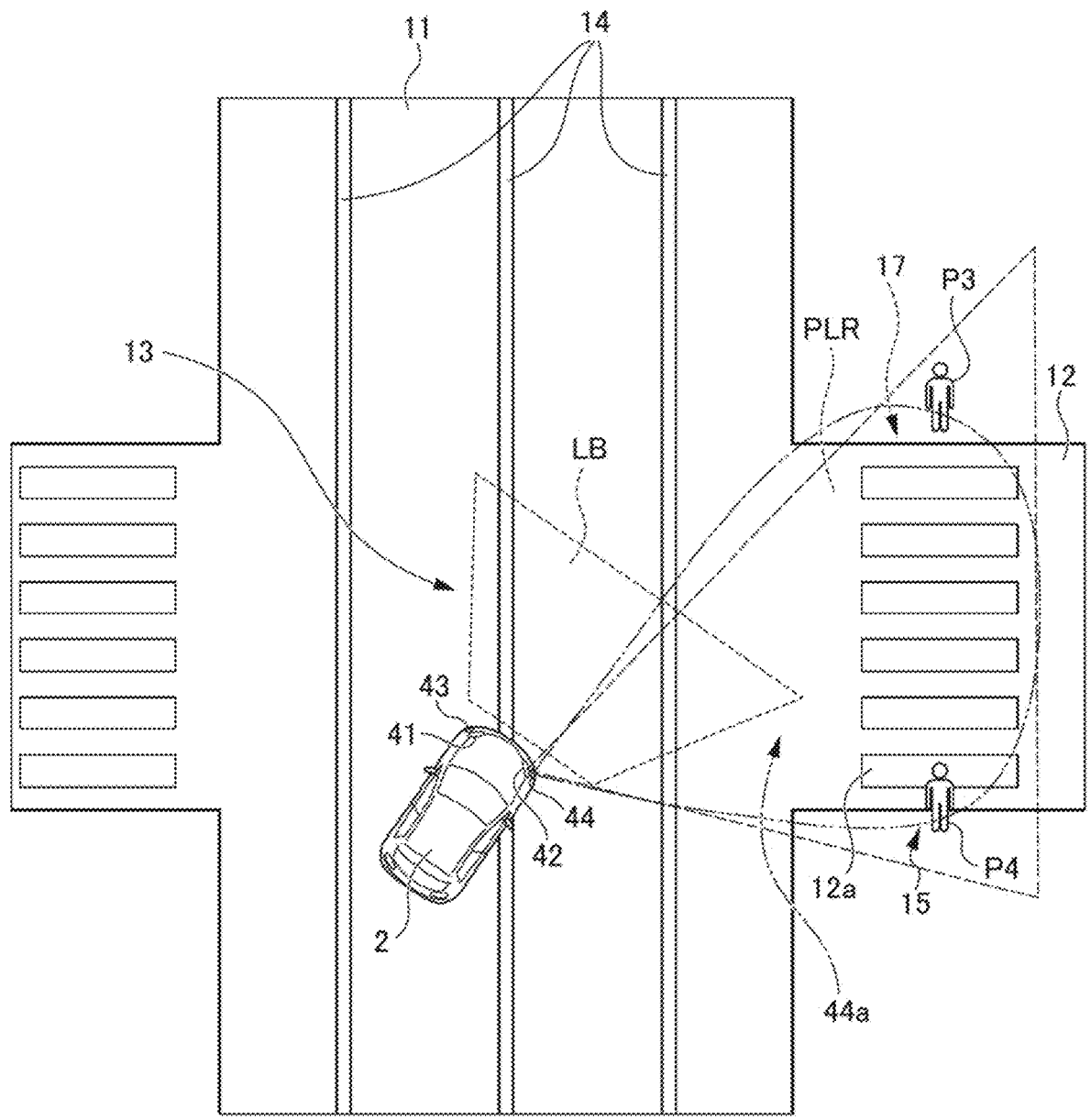
FIG. 6B is a schematic diagram showing, in a plan view, another state of irradiation light from the pattern irradiation lamp, etc.
Figure 6C:
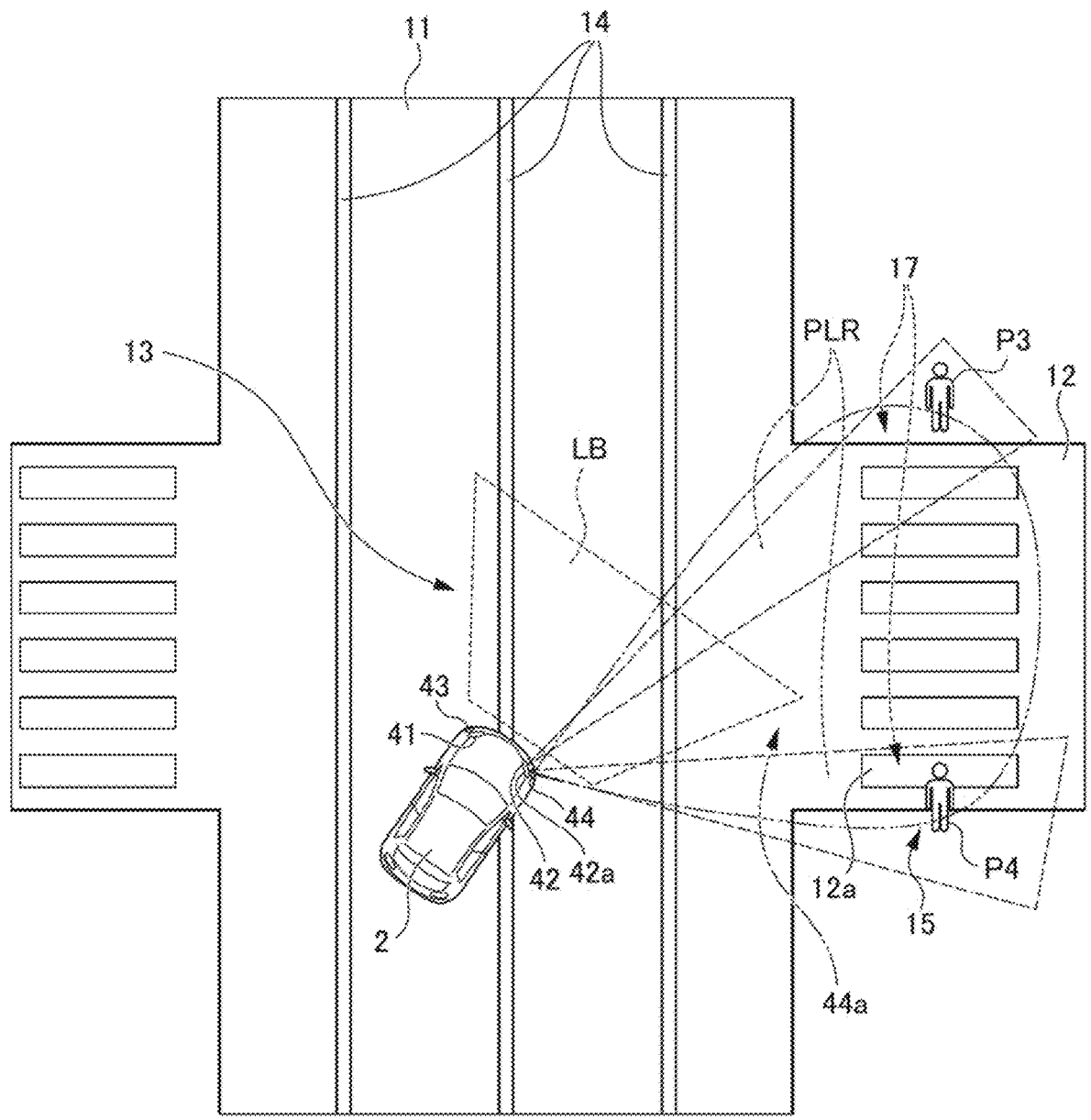
FIG. 6C is a schematic diagram showing, in a plan view, another state of irradiation light from the pattern irradiation lamp, etc.

FIG. 6A is a schematic diagram showing, in a plan view, the irradiation light from the pattern irradiation lamp and cornering light in FIG. 2 of the vehicle turning right at the intersection. FIG. 6A shows a case of the vehicle 2 trying to make a right turn at an intersection 13 between a road 11 on which the vehicle 2 is located, and a road 12 intersecting the road 11. The road 11 is a road of wide width in which the divider lines 14 including the road center line are drawn, whereby sidewalks are demarcated, and the road 12 is a narrower in width. The pedestrian crossing 12a in the vicinity of the intersection 13 of the road 12 is indicated by traffic marking. It should be noted that the irradiation light from the low beam lamp 5 is indicated by the reference symbol LB.

In the vehicle 2, when a condition determined as the driver having an intention of turning right is satisfied such as operation of right turn on the directional indicator lever, and vehicle speed at the moment of this operation, the right-side cornering light 44 and right-side pattern irradiation lamp 42 synchronously irradiate irradiation light. The left-side pattern irradiation lamp 41 is unlit, and the right-side pattern irradiation lamp 42 irradiates the road surface of the light distribution region 44a including the right side of the vehicle 2. The right-side pattern irradiation lamp 42 irradiates the irradiation pattern light distribution region 17 of the right-side irradiation light PLR.

It should be noted that, in the case of there being an oncoming vehicle during right turn when the vehicle is passing on the left side, within the time waiting for passing of the oncoming vehicle approaching, control is performed to turn off the right-side pattern irradiation lamp 42, to suppress the risk of the driver of the oncoming vehicle being dazed by the irradiation light from the right-side pattern irradiation lamp 42. In addition, also for during a left turn in the case of the vehicle passing on the right side, the left-side pattern irradiation lamp 41 irradiates the irradiation light, and the right-side pattern irradiation lamp 42 is unlit. It should be noted that, in the following embodiment, for during left turn, since left/right becomes the opposite control during right turn, explanation thereof is omitted.

At this time, the light distribution region 44a of the right-side cornering light 44, and the irradiation pattern light distribution region 17 of the right-side pattern irradiation lamp 42 partially overlap in a plan view. In practice, the light distribution region 44a of the right-side cornering light 44 is a relatively low region including the road surface; whereas, the irradiation pattern light distribution region 17 of the right-side pattern irradiation lamp 42 is a relatively higher region than the light distribution region 44a. It should be noted that the light distribution region 44a and irradiation pattern light distribution region 17 may partially overlap in the height direction.

In addition to the irradiation light LB from the low beam lamp 5, by irradiating the irradiation light simultaneously from the right-side cornering light 44 and the right-side pattern irradiation lamp 42, it was verified that the visibility to a pedestrian 15 on the right side of the vehicle during right turn improves remarkably. More specifically, when defining the positions of the pedestrians 15 in FIGS. 5 and 6a as P1, P2, P3 and P4, and explaining by referencing each of these positions as pedestrians, the verification results are as follows.

Visibility to each of the pedestrian P1 on the left sidewalk of the road 12, pedestrian P2 on the right sidewalk on the opposite side of the oncoming lane, and pedestrian P3 trying to cross relatively from the back side to the near side, in a direction viewing the pedestrian crosswalk 12a of the road 12 from the vehicle 2 improved remarkably from a "hardly seen" level to "well seen" level, compared to a case of irradiating only the irradiation light LB from the low beam lamp 5. It should be noted that, in the case of irradiating the left-side irradiation light PLL from the left-side pattern irradiation lamp 41 in the irradiation pattern light distribution region 16 on the left sidewalk of the road 11, visibility noticeably improved for the pedestrian P1.

However, the visibility to the pedestrian P4 trying to cross from the near side to back side relatively in a direction viewing the pedestrian crossing 12a of the road 12 from the vehicle 2 is the "normally seen" level, due to only being irradiation light irradiated from the right-side cornering light 44. Therefore, by establishing as the irradiation pattern light distribution region 17 such as that shown in FIGS. 6B and 6C, the visibility to the pedestrian P2 also remarkably improves to the "well seen" level. More specifically, in FIG. 6B, by oscillating the above-mentioned right-side pattern irradiation lamp 42 in the left/right direction, or widening the width of the irradiation range of the right-side pattern irradiation lamp 42, it is possible to obtain the irradiation pattern light distribution region 17. In addition, in FIG. 6C, by providing a second right-side pattern irradiation lamp 42A which further irradiates the right side in addition to the right-side pattern irradiation lamp 42 of FIG. 6A, the irradiation pattern light distribution region 17 is obtained.

Next, by irradiating light on the irradiation pattern light distribution regions 16, 17 of the vehicle 2 in the irradiation pattern in which a bright region and dark region are alternately repeated, a phenomenon when visually confirming the pedestrian 15 from the driver will be explained by referencing FIGS. 7 to 10. It should be noted that, although the phenomenon is explained in FIGS. 7 to 10 in the case of irradiating light in the irradiation pattern in which the bright region and dark region are alternately repeated from the left-side pattern irradiation lamp 41, which is the left-side photoirradiator, this also applies to the phenomenon in the case of irradiating light by the right-side pattern irradiation lamp 42, which is the right-side photoirradiator.

Figure 7:
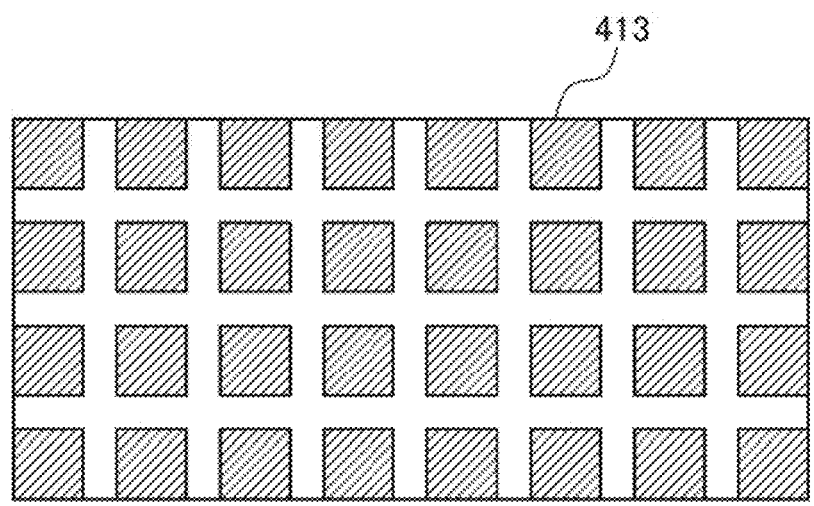
FIG. 7 is a view schematically showing a shading mask applied to the pattern irradiation lamp of FIG. 2.
Figure 8:
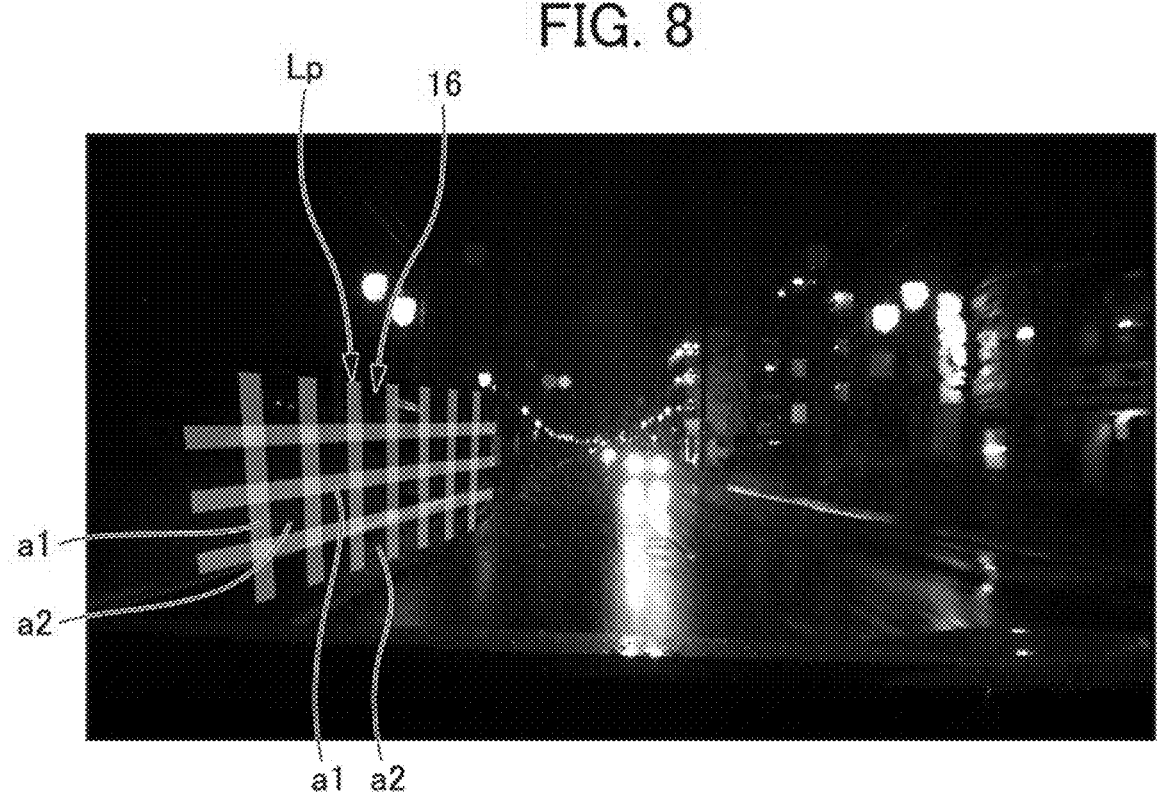
FIG. 8 is a schematic diagram showing an aspect viewing the irradiation light of the irradiation pattern of FIGS. 5, 6A, 6B and 6C in the driving field of view at night.

FIG. 7 is a view schematically showing a shading mask 413 applied to the left-side pattern irradiation lamp 41 of FIG. 2. FIG. 8 is a schematic diagram showing an aspect of viewing the left-side irradiation light PLL of the irradiation pattern Lp from the shading mask 413 of FIG. 7 in the driving field of view at night. The irradiation pattern Lp of the left-side irradiation light PLL of the irradiation pattern by the shading mask 413 is irradiated on the left-side irradiation pattern light distribution region 16 ahead of the vehicle 2, and is brightly visible in a grid pattern. In other words, the grid-like irradiation pattern Lp in which the bright region a1 and dark region a2 are alternately repeated can be seen.

Figure 9:
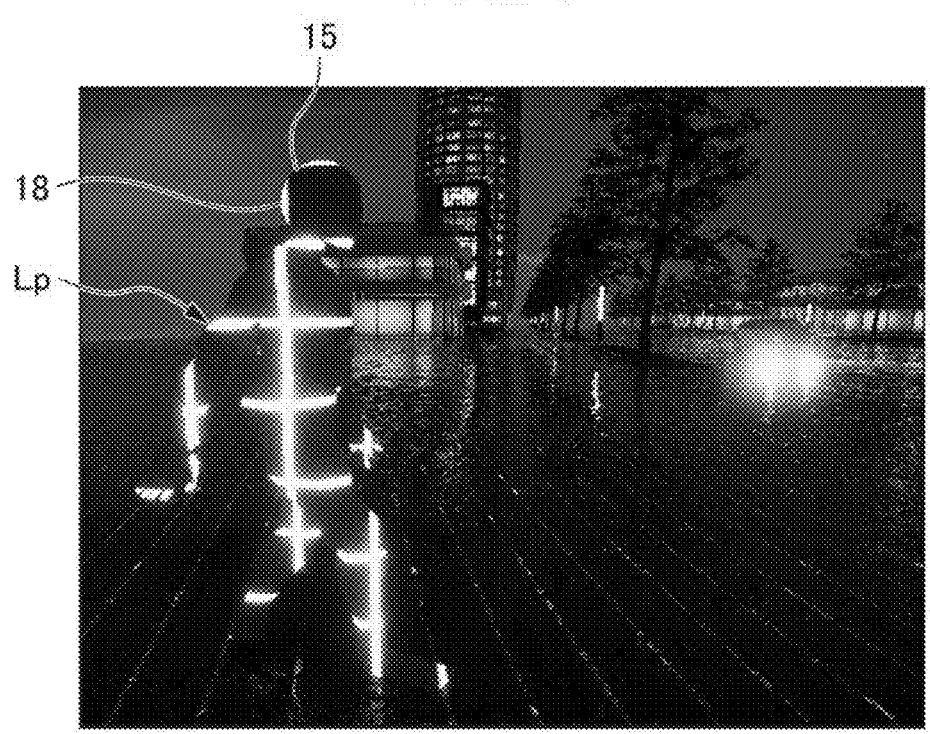
FIG. 9 is a view showing, from the viewpoint of the driver, an aspect of a pedestrian standing still being irradiated by the irradiation light from the pattern irradiation lamp of FIG. 2.
Figure 10:
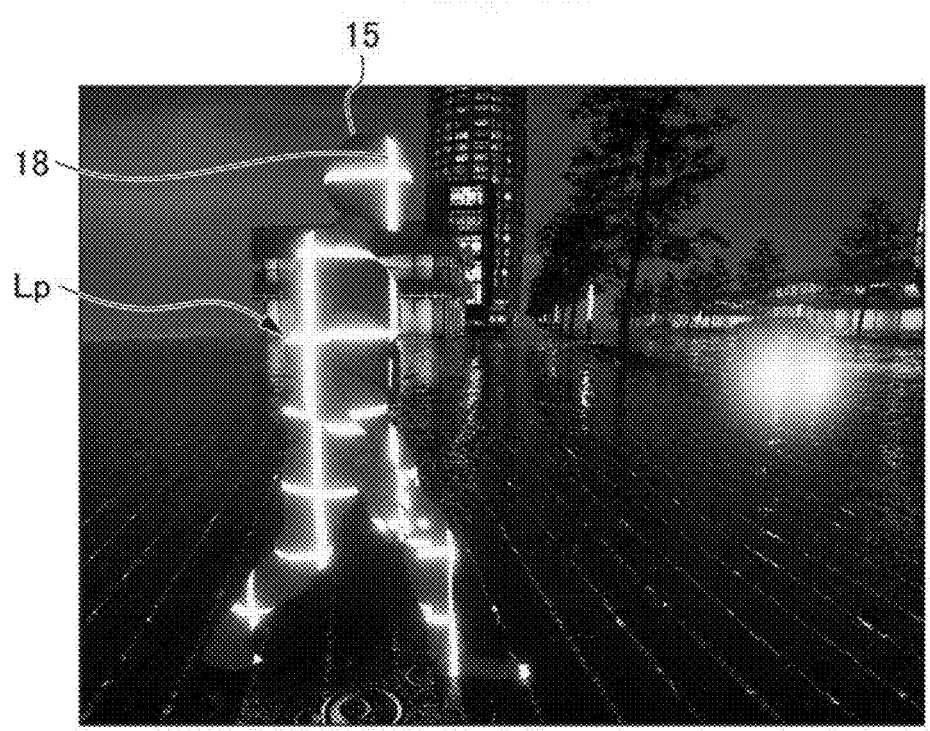
FIG. 10 is a view showing, from the viewpoint of the driver, an aspect of a pedestrian during movement being irradiated by irradiation light from the pattern irradiation lamp of FIG. 2.

FIG. 9 is a view showing, in the viewpoint of the driver, an aspect of the pedestrian 15 standing still being irradiated by light of the irradiation pattern Lp from the left-side pattern irradiation lamp 41 of the vehicle headlight device 1. FIG. 10 is a view showing, in a viewpoint of the driver, an aspect of the pedestrian 15 during movement being irradiated by light of the irradiation pattern Lp from the left-side pattern irradiation lamp 41 of the vehicle headlight device 1.

When the pedestrian 15 moves from the roadside, as understood by referencing FIGS. 9 and 10, the shape of the bright part 18 of the grid-like pattern irradiated by light of the irradiation pattern Lp on the pedestrian 15 changes. The bright part 18 has great contrast from the adjacent parts, and is clearly visible from the driver.

In practice, the shape of the bright part 18 can be seen as changing and moving due to the visual property of people. The change in shape of the bright part 18 occurs in the peripheral field of view of the driver. It is thereby possible for the driver to immediately recognize the presence of the pedestrian 15. For this reason, overlooking of pedestrians by the driver can be remarkably improved.

The configurations of the left-side pattern irradiation lamp 41 and right-side pattern irradiation lamp 42 of the vehicle headlight device 1 according to the embodiment of the present invention are not limited to the embodiments of FIGS. 2 and 7. For example, the left-side pattern irradiation lamp 41 and right-side pattern irradiation lamp 42 may be configured by projectors adopting a DMD (Digital Mirror Device) including a micro mirror group irradiating light in an irradiation pattern Lp on the irradiation pattern light distribution regions 16, 17.

In addition, although configured so as to irradiate the irradiation light from the left/right pattern irradiation lamps 41, 42 during straight travel, and turn off the left pattern irradiation lamp during right turn, it may be configured so as to irradiate the irradiation light from the right pattern irradiation lamp only during right turn. In addition, although the left/right cornering lights and left/right pattern irradiation lamps 41, 42 are irradiated simultaneously, it is not limited thereto, and it may be synchronized by irradiating the left/right pattern lamps 41, 42 after the passage of a predetermined time since irradiation of the left/right cornering lights.

According to the vehicle headlight device 1 of the present embodiment, the following effects are exerted.

(1) The vehicle headlight device 1 includes the right-side pattern irradiation lamp 42 as a pattern photoirradiator which irradiates light on the irradiation pattern light distribution region 17 of the vehicle 2 in the irradiation pattern Lp in which the bright region a1 and dark region a2 are alternately repeated; and the right-side cornering light 44 which irradiates the light distribution region 44a below the irradiation pattern light distribution region 17 in a form in which the entire area is a bright region. Since the irradiation pattern light distribution region 17 of a direction in which the vehicle 2 is trying to turn right is irradiated in the irradiation pattern Lp in which the bright region a1 and dark region a2 are alternately repeated by the right-side pattern irradiation lamp 42, the presence of the pedestrian 15 at a side is easily recognized from the driver according to the visual property of a person. In addition thereto, the light distribution region 44a below the irradiation pattern light distribution region 17 is irradiated by the right-side cornering light 44, whereby overlooking of pedestrians by the driver can be improved, even under adverse conditions such as nighttime or rain at night. Also in the case of the vehicle 2 trying to turn left, the left-side pattern irradiation lamp 41 and left-side cornering light 43 function similarly, and can improve overlooking of pedestrians by the driver, similarly to the case of the vehicle 2 trying to turn right.

(2) In the vehicle headlight device 1, the right-side pattern irradiation lamp 42 as the pattern photoirradiator irradiates light synchronously with the right-side cornering light 44; therefore, it is possible for the driver to reliably recognize the presence of the pedestrian 15 in the direction in which the vehicle 2 tries to turn right. Also in a case of the vehicle 2 trying to turn left, since the left-side pattern irradiation lamp 41 and left-side cornering light 43 irradiate light synchronously, overlooking of pedestrians by the driver can be improved, similarly to the case of the vehicle 2 trying to turn right.

The present invention establishes the light distribution region of the cornering light as a light distribution region under the irradiation pattern light distribution region of the pattern photoirradiator; however, this is a technical concept also encompassing a case of the light distribution region of the cornering light partially overlapping the irradiation pattern light distribution region of the pattern photoirradiator.

EXPLANATION OF REFERENCE NUMERALS a1 bright region
a2 dark region
H person
Lp irradiation pattern
1 vehicle headlight device
2 vehicle
3 turn signal lamp
4 pattern irradiation lamp
5 low beam lamp
6 high beam lamp
7 forward field of view
8 central field of view
9 left peripheral field of view
10 right peripheral field of view
11 road
12 road
13 intersection
14 divider line
15 pedestrian
16 irradiation pattern light distribution region
17 irradiation pattern light distribution region
18 bright part
41 left-side pattern irradiation lamp
42 right-side pattern irradiation lamp
43 left-side cornering light
44 right-side cornering light
44a light distribution region

What is claimed is:

1. A vehicle headlight device comprising:
   low beam lamp that irradiates light in a predetermined light distribution area of the low beam lamp of a vehicle;
   high beam lamp that irradiates light in a predetermined light distribution area of the high beam lamp of the vehicle;
   a pattern photoirradiator which irradiates light on a predetermined irradiation pattern light distribution region of the vehicle in an irradiation pattern in which a bright region and a dark region are alternately repeated; and
   a cornering light which irradiates a light distribution region under the irradiation pattern light distribution region in a form in which an entire area is a bright region so as to irradiate the road surface of the light distribution region including the side of the vehicle,
   wherein the pattern photoirradiator is provided separately from the low beam lamp, high beam lamp and the cornering light
   wherein:
   the pattern photoirradiator, the low beam lamp, and the high beam lamp are arranged in this order from an outer side toward an inner side in a width direction of the vehicle; and
   the cornering light is disposed below the pattern photoirradiator, the low beam lamp, and the high beam lamp.

2. The vehicle headlight device of claim 1, further comprising a turn signal lamp which is arranged outwardly of and immediately adjacent to the photoirradiator.

3. The vehicle headlight device of claim 2, wherein the cornering light is substantially aligned vertically with the turn signal lamp.

4. The vehicle headlight device according to claim 1, wherein the pattern photoirradiator irradiates light synchronously with the cornering light.

5. The vehicle headlight device of claim 1, wherein the vehicle headlight device is disposed at each of a left side and a right side of the vehicle to thereby provide a pair of the headlight devices each comprising the low beam lamp, the high beam lamp, the pattern photoirradiator, and the cornering light, and each of the headlight devices further comprises a second pattern photoirradiator which irradiates light on a second predetermined irradiation pattern light distribution region of the vehicle in an irradiation pattern in which a bright region and a dark region are alternately repeated, wherein the second predetermined irradiation pattern light distribution region is positioned more outwardly of and separated from the predetermined irradiation pattern light distribution region.

* * * * *